United States Patent [19]
Breault et al.

[11] 3,762,957
[45] Oct. 2, 1973

[54] METHOD OF FABRICATING LIGHTWEIGHT ELECTRODES

[75] Inventors: Richard David Breault, Coventry; Alluren Leonard Marcere, East Hartford; Arthur Everett Jackson, Enfield, all of Conn.

[73] Assignee: United Aircraft Corporation, East Hartford, Conn.

[22] Filed: June 8, 1970

[21] Appl. No.: 44,498

[52] U.S. Cl. .............................................. 136/121
[51] Int. Cl. ......................................... H01m 13/02
[58] Field of Search ................... 136/120 FC, 86 D, 136/121, 122

[56] References Cited
UNITED STATES PATENTS

| | | | |
|---|---|---|---|
| 3,444,004 | 5/1969 | Smith | 136/86 D |
| 3,549,423 | 12/1970 | Grubb et al. | 136/120 FC |
| 3,238,068 | 3/1966 | Hipp | 136/120 FC |
| 3,440,107 | 4/1969 | Barber | 136/120 FC |

Primary Examiner—Winston A. Douglas
Assistant Examiner—M. J. Andrews
Attorney—Laurence A. Savage

[57] ABSTRACT

An electrode with a noble metal loading of no greater than 1 mg./cm.$^2$ is prepared by depositing an alloy catalyst on a finely divided support, mixing the supported alloy catalyst and a hydrophobic polymer, suspending the mixture in a wetting agent water solution, applying the suspension onto a substrate, pressing the coated substrate, drying the coated pressed substrate and sintering the coated, pressed, dried substrate.

7 Claims, 1 Drawing Figure

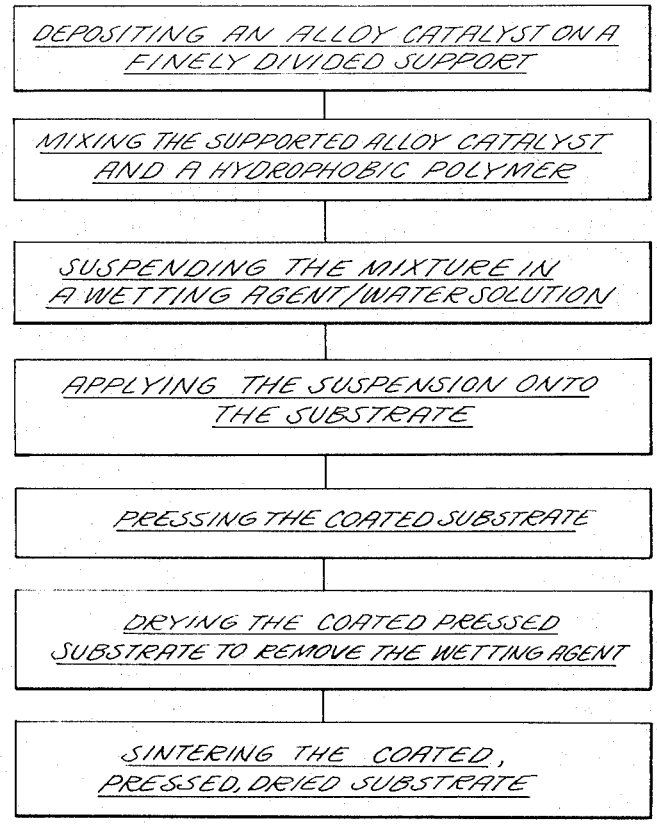

DEPOSITING AN ALLOY CATALYST ON A FINELY DIVIDED SUPPORT

MIXING THE SUPPORTED ALLOY CATALYST AND A HYDROPHOBIC POLYMER

SUSPENDING THE MIXTURE IN A WETTING AGENT/WATER SOLUTION

APPLYING THE SUSPENSION ONTO THE SUBSTRATE

PRESSING THE COATED SUBSTRATE

DRYING THE COATED PRESSED SUBSTRATE TO REMOVE THE WETTING AGENT

SINTERING THE COATED, PRESSED, DRIED SUBSTRATE

INVENTORS
RICHARD D. BREAULT
ALLUREN L. MARCERE
ARTHUR E. JACKSON, JR.

BY *[signature]*
ATTORNEY

METHOD OF FABRICATING LIGHTWEIGHT ELECTRODES

BACKGROUND OF THE INVENTION

1. Field of the Invention

This invention relates to the fabrication of fuel cell electrodes and particularly to lightweight electrodes for use in fuel cells.

2. Background of the Invention

In fuel cells utilizing electrodes having a noble metal catalyst, it is desirable to use as little noble metal as possible because of the extremely high cost of the noble metals, while still providing an electrode which operates as efficiently as electrodes having a high loading of noble metal. Electrodes are known in the art which have a noble metal loading of 10 mg./cm$^2$ or greater, and electrodes have been proposed having a lower metal noble loading. However, those electrodes known heretofore which have a lower loading have fallen short of desired performance and efficiency and do not operate as efficiently as the more highly loaded electrodes. The cost of producing an electrode according to our invention is approximately 1/15 of the cost of a commercially available electrode having, for example, a noble metal loading of 10 mg./cm.$^2$ (5 mg./cm.$^2$ of platinum and 5 mg./cm.$^2$ of rhodium).

SUMMARY OF THE INVENTION

It is the object of this invention to provide a lightweight fuel cell electrode which contains less than 1 mg./cm.$^2$ of noble metal with performance better than, or equivalent to, known electrodes having a noble metal content of 10 mg./cm.$^2$ or greater.

It has been found that the foregoing object may be readily attained through the use of the lightweight electrode fabrication technique disclosed herein. In accordance with our invention a method of forming a lightweight electrode having a noble metal content of less than 1 mg./cm.$^2$ comprises mixing a supported alloy catalyst and a hydrophobic polymer and suspending the admixture in a wetting agent/water solution; applying the suspension onto a substrate in a thin concentrated layer so that the noble metal content is no greater than 1 mg./cm.$^2$. The substrate may be, for example, either a screen having a thin layer of metal foil, wax paper or a thin sheet of polytetrafluorethylene pressed into it to fill approximately one half the void volume of the screen, or the substrate may be a hydrophobic carbon paper; pressing the coated substrate; drying the coated, pressed substrate to remove the wetting agent; and sintering the coated, pressed, dried substrate to bind the polymer particles together, make them more hydrophobic and to increase the structural integrity of the electrode.

Other objects, features, and advantages of the present invention will become more apparent in light of the following detailed description of a preferred embodiment thereof, as illustrated in the accompanying drawing.

BRIEF DESCRIPTION OF THE DRAWING

The sole FIGURE is a block diagram of a method of fabricating a lightweight fuel cell electrode in accordance with our invention.

DESCRIPTION OF THE PREFERRED EMBODIMENT

A method of forming a lightweight fuel cell electrode containing less than 1 mg./cm.$^2$ of noble metal is illustrated in the FIGURE. In accordance with this invention an alloy catalyst, which may consist of 70 weight percent platinum and 30 weight percent ruthenium as a finely divided powder, is deposited on a finely divided support, such as graphite powder, in the proportions of 10 weight percent alloy catalyst and 90 weight percent finely divided support. The supported alloy catalyst is then mixed with a hydrophobic polymer such as fluorinated hydrocarbon (for example polytetrafluoroethylene or copolomers of polytetrafluoroethylene and polyhexafluoropropylene) as a powder or as colloidal particles in suspension in a ratio of 4 parts supported alloy catalyst to one part hydrophobic polymer (by weight), and suspending the admixture in a wetting agent/water solution, such as an alkylaryl polyether alcohol/water solution in a ratio of one gram of alloy catalyst per 5 milliliters of solution. A satisfactory alkylaryl polyether alcohol is Triton X-100 (manufactured by Rohm & Haas Co.). The wetting agent/water solution is a very necessary ingredient because its role is to disperse the hydrophobic polymer uniformly over the catalyst. The suspension is then applied to the substrate by any of the known means, such as spraying, for example, and the coated substrate may then, if desired, be air dried at a temperature in the range of 100° to 180°F to remove the water. The coated screen is then pressed at a pressure in the range of 400 to 3,500 psi depending on the type of substrate used 3,500 1,000 to psi for a screen substrate and 400 to 2,000 psi for a carbon paper substrate), and the coated, pressed substrate is then dried at a temperature in the range of 250° to 350°F to remove the wetting agent. The coated, pressed, dried substrate is then sintered at a temperature in the range of 570° to 620°F.

A particular screen which is found to be desirable is a 100 mesh gold-plated tantalum screen made with a 3 mil wire size. When a screen is used as a substrate, a 1.5 mil sheet of aluminum foil is pressed into the screen at a pressure of about 10,000 psi to fill approximately one half the void volume of the screen. This allows the catalyst to be concentrated in a thin layer on the substrate. Instead of the aluminum foil, waxed paper or a thin film of polytetrafluoroethylene (Teflon, for example) may be used. The aluminum foil or Teflon film can be removed before or after pressing by mechanically stripping it off, or can be left on the screen until after sintering when the aluminum foil could be dissolved off in potassium hydroxide or phosphoric acid (if Teflon film is used it can be mechanically stripped off, even after sintering); if waxed paper were used instead of the aluminum foil, it should be removed prior to sintering.

If it is desired to use a hydrophobic carbon paper as the substrate, it is prepared as follows:

A 70 percent porous carbon paper with a mean pore size of about 70 microns is dipped in a 60 weight percent polytetrafluoroethylene dispersion (TFE-30 manufactured by the DuPont Company is acceptable) to acquire a loading of about 20 mg./cm.$^2$ of the polytetrafluoroethylene.

Although the preferred process steps have been enumerated, certain composition, temperature and pressure modifications may be made without sacrificing the product characteristics. For example, any of the impure hydrogen catalysts known to the art can be used. These consist of alloys of platinum with metals such as ruthenium, rhodium, iridium, and nickel. While a composition of 70 weight percent of platinum and 30 weight percent of ruthenium is preferred, an acceptable range is 50 to 80 weight percent of platinum and 20 to 50 weight percent of the other metal. Finely divided supports other than graphite, such as carbon or boron carbide can also be used. While a composition of 10 weight percent alloy catalyst and 90 weight percent finely divided support is preferred, a range of 10 to 35 weight percent alloy catalyst and 65 to 90 weight percent of support produces an acceptable electrode. The preferred ratio of supported alloy catalyst (platinum-metal-support) to hydrophobic polymer is 4 parts supported alloy catalyst : 1 part hydrophobic polymer (by weight), although 7 parts supported alloy catalyst : 3 parts hydrophobic polymer or 9 parts supported alloy catalyst : 1 part hydrophobic polymer produce acceptable results. The wetting agent/water solution preferrably contains 2.5 to 5.0 volume percent wetting agent, although a composition in the range of 0.2 to 5.0 volume percent wetting agent produces satisfactory results. The preferred proportion of alloy catalyst (platinum-metal alloy) to suspension is 1 gm. catalyst to 5 milliliters of suspension when graphite is used as a catalyst support, but the proportions may go to 1 gm. of catalyst to 20 milliliters of suspension when carbon is used as the support, or 1 gm. catalyst to 4 milliliters when boron carbide is used as the catalyst support. The pressing step which occurs after air drying may be carried out at pressures between 1,000 and 3,500 psi when a screen is used and between 400 to 2,000 psi when hydrophobic carbon paper is used. The drying step may be carried out between 250° and 350°F, although 300°F is preferred, and drying time is shortened by drying in a vacuum. Finally the sintering temperature may be in the range of 570° to 620°F, while 590°F or 620°F is preferred.

In order to demonstrate the advantage of the present invention, a structure fabricated in accordance with the described method is compared to a structure fabricated from a technique known in the art which has a noble metal content of about 10 mg./cm.$^2$.

EXAMPLE

An electrode according to our invention was prepared as follows: A 1.5 mil thick sheet of aluminum foil was pressed into a 100 mesh gold-plated tantalum screen with a 3 mil wire size at a pressure of 10,000 psi to fill approximately one-half the void volume of the screen. A suspension was prepared by mixing a catalyst consisting of 8 weight percent of platinum, 2 weight percent of ruthenium and 90 weight percent of boron carbide with Teflon-30 (manufactured by the DuPont Company) in a ratio of 4 parts supported alloy catalyst to 1 part Teflon-30 (by weight); the catalyst-Teflon admixture was then suspended in a 2.5 volume percent Triton X-100/water solution in a ratio of 1 gm. of alloy catalyst per 4 milliliters of solution. The suspension of catalyst and Teflon was then sprayed onto the screen so that the noble metal loading was 0.62 mg./cm.$^2$. The sprayed screen was air dried at 120°F to remove the water. The aluminum foil was then stripped off the elctrode, which was then pressed at 1,300 psi, and then vacuum dried for 16 hours at 250°F to remove the Triton X-100 wetting agent. The electrode was then sintered at 590°F for five minutes.

An electrode made by the above-described process was tested as an anode at 300°F in 96 weight percent phosphoric acid. The anode contained 0.62 mg./cm.$^2$ of noble metal (platinum-ruthenium alloy), and typical results for the electrode are tabulated in Table I.

TABLE I

| FUEL | ANODE POLARIZATION (millivolts) | | |
|---|---|---|---|
| | 100 ASF | 200 ASF | 300 ASF |
| HYDROGEN | 12 | 26 | 54 |
| IMPURE HYDROGEN (80% H$_2$ - 1.3% CO - 18.7% CO$_2$) | 15 | 87 | 131 |

Typical results for a commercially available electrode containing 10 mg./cm.$^2$ of noble metal (5 mg./cm.$^2$ platinum - 5 mg./cm.$^2$ rhodium) tested as an anode in 96 weight percent phosphoric acid at 300°F are shown in Table II.

TABLE II

| FUEL | ANODE POLARIZATION (millivolts) | | |
|---|---|---|---|
| | 100 ASF | 200 ASF | 300 ASF |
| HYDROGEN | 32 | 56 | 77 |
| IMPURE HYDROGEN (80% H$_2$ - 1.3% CO - 18.7% CO$_2$) | 48 | 88 | 127 |

A comparison of Table I and Table II demonstrates that the process described (and the electrode fabricated thereby) achieves a lower anode polarization voltage (in millivolts) for both types of fuels and for all three current densities in amps per square foot than a commercially available electrode having a noble metal content of 10 mg./cm.$^2$, except for one case in which the voltages are essentially equal within measurement tolerances.

Although the invention has been shown and described with respect to a preferred embodiment it should be understood by those skilled in the art that various changes and omissions in the form and detail thereof may be made therein without departing from the spirit and scope of the invention.

What we claim as new and desire to secure by Letters Patent of the United States is:

1. A method of fabricating a lightweight fuel cell electrode having a noble metal content no greater than 1 mg./cm.$^2$, comprising the steps of:
   preparing an electrically conductive substrate by dipping porous carbon paper in a dispersion of about 60 weight percent polytetrafluoroethylene so that the carbon paper has a loading of about 20 mg./cm.$^2$ of polytetrafluoroethylene;
   providing an alloy catalyst consisting essentially of platinum alloyed with at least one metal selected from the group consisting of ruthenium, rhodium, iridium and nickel, said platinum comprising 50 to 80 weight percent of the alloy;
   depositing the alloy catalyst on a finely divided support, said alloy catalyst comprising 10 to 35 weight percent of the supported alloy catalyst;

mixing the supported alloy catalyst with a hydrophobic polymer, said supported alloy catalyst comprising 70 to 90 weight percent of the mixture;

providing a wetting agent/water solution, said wetting agent comprising 0.2 to 5.0 volume percent of the solution;

suspending the mixture of supported alloy catalyst and hydrophobic polymer in the wetting agent/water solution in the proportion of 1 gm. of alloy catalyst to 4 to 20 milliliters of solution;

applying said suspension onto said substrate so that the alloy loading is no greater than 1 mg./cm.$^2$; drying the coated substrate to remove water then pressing the coated substrate;

further drying the coated, pressed substrate until the wetting agent is removed; and then sintering the coated, pressed dried substrate.

2. A method of fabricating a lightweight fuel cell electrode having a noble metal content no greater than 1 mg./cm.$^2$, comprising the steps of:

preparing an electrically conductive substrate by pressing a thin film of material selected from the group consisting of polytetrafluoroethylene, aluminum foil and waxed paper into a screen to fill about one-half the void volume of the screen;

providing an alloy catalyst consisting essentially of platinum alloyed with at least one metal selected from the group consisting of ruthenium, rhodium, iridium and nickel, said platinum comprising 50 to 80 weight percent of the alloy;

depositing the alloy catalyst on a finely divided support, said alloy catalyst comprising 10 to 35 weight percent of the supported alloy catalyst;

mixing the supported catalyst with a hydrophobic polymer, said supported alloy catalyst comprising 70 to 90 weight percent of the mixture;

providing a wetting agent/water solution, said wetting agent comprising 0.2 to 5.0 volume percent of the solution;

suspending the mixture of supported alloy catalyst and hydrophobic polymer in the wetting agent/water solution in the proportion of 1 gm. of alloy catalyst to 4 to 20 milliliters of solution;

applying said suspension onto said substrate so that the alloy loading is no greater than 1 mg./cm.$^2$; drying the coated substrate to remove water then pressing the coated substrate;

further drying the coated, pressed substrate until the wetting agent is removed; and then sintering the coated, pressed dried substrate.

3. A method of fabricating a lightweight electrode as defined in claim 2, wherein the thin film is removed prior to sintering.

4. A method of fabricating a lightweight electrode as defined in claim 2, wherein the support is selected from the group consisting of graphite, carbon and boron carbide.

5. A method of fabricating a lightweight electrode as defined in claim 2, wherein the further drying step is carried out between 250° and 350°F.

6. A method of fabricating a lightweight electrode as defined in claim 2, wherein the sintering step is carried out between 570° and 620°F.

7. A method of fabricating a lightweight electrode, as defined in claim 2, wherein the metal alloyed with platinum is ruthenium.

* * * * *